United States Patent
Seo

(10) Patent No.: US 8,294,056 B2
(45) Date of Patent: Oct. 23, 2012

(54) BUSHING TERMINAL OF VACUUM CIRCUIT BREAKER AND METHOD THEREOF

(75) Inventor: Jae-Kwan Seo, Chungcheongbuk-Do (KR)

(73) Assignee: LS Industrial Systems Co., Ltd., Gyeonggi-Do (KR)

( * ) Notice: Subject to any disclaimer, the term of this patent is extended or adjusted under 35 U.S.C. 154(b) by 382 days.

(21) Appl. No.: 12/641,946

(22) Filed: Dec. 18, 2009

(65) Prior Publication Data

US 2010/0163528 A1     Jul. 1, 2010

(30) Foreign Application Priority Data

Dec. 31, 2008   (KR) .................. 10-2008-0138673

(51) Int. Cl.
*H01H 33/66*     (2006.01)
(52) U.S. Cl. ..................................... 218/121; 200/50.27
(58) Field of Classification Search .......... 218/118–121, 218/140, 152–154; 361/605–609; 200/50.21–50.24
See application file for complete search history.

(56) References Cited

U.S. PATENT DOCUMENTS

| | | | |
|---|---|---|---|
| 5,459,293 A * | 10/1995 | Hodkin et al. | 361/609 |
| 5,486,662 A | 1/1996 | Takiishi | |
| 5,757,260 A * | 5/1998 | Smith et al. | 361/603 |
| 5,929,410 A | 7/1999 | Mun | |
| 6,787,725 B2 | 9/2004 | Kim et al. | |
| 6,884,949 B2 | 4/2005 | Yoon | |
| 7,227,279 B2 | 6/2007 | Kim | |

FOREIGN PATENT DOCUMENTS

| | | |
|---|---|---|
| EP | 0634765 | 1/1995 |
| JP | 50-120000 | 9/1975 |
| JP | 6-249241 | 9/1994 |
| KR | 1986-0007486 | 10/1986 |

OTHER PUBLICATIONS

Korea Office action, mail date is Oct. 20, 2010.
U.S. Appl. No. 12/633,827 to Park, which was filed on Dec. 9, 2009.
U.S. Appl. No. 12/633,863 to Kim et al., which was filed on Dec. 9, 2009.
U.S. Appl. No. 12/635,911 to Woo, which was filed on Dec. 11, 2009.
U.S. Appl. No. 12/641,769 to Kim, which was filed on Dec. 18, 2009.
U.S. Appl. No. 12/645,783 to Kim, which was filed on Dec. 23, 2009.
U.S. Appl. No. 12/645,620 to Kim et al., which was filed on Dec. 23, 2009.
U.S. Appl. No. 12/651,501 to Tak et al., which was filed on Jan. 4, 2010.

* cited by examiner

*Primary Examiner* — Amy Cohen Johnson
*Assistant Examiner* — Marina Fishman
(74) *Attorney, Agent, or Firm* — Greenblum & Bernstein P.L.C.

(57) ABSTRACT

Disclosed is a bushing terminal of a vacuum circuit breaker used for interrupting current, which includes: a terminal body having a cylinder that can be inserted into the interior of a contactor and annular protrusions formed to be protrude from an outer circumferential surface of the cylinder; and a flange having an insertion hole through which the cylinder is inserted, wherein the annular protrusions are plastic-deformed so as to be fixed to the insertion hole of the flange.

4 Claims, 7 Drawing Sheets

PRIOR ART

BUSHING TERMINAL OF VACUUM CIRCUIT BREAKER AND METHOD THEREOF

BACKGROUND OF THE INVENTION

1. Field of the Invention

The present invention relates to a bushing terminal of a vacuum circuit breaker and a fabrication method thereof and, more particularly, to a bushing terminal, a cradle terminal that can be connected to a tulip type contactor constituting a main circuit unit of a vacuum circuit breaker, capable of improving illogical factors of its fabrication process, and a fabrication method thereof.

2. Description of the Related Art

In general, a circuit breaker is classified into a draw-out type circuit breaker and a fixed type circuit breaker. The fixed type circuit breaker is configured to have only a circuit breaker main body which is fixed within a distributing board panel, and the draw-out type circuit breaker includes an outer casing called a cradle facilitating the maintenance of the circuit breaker and allowing only a circuit breaker main body to be drawn in or out.

Here, a draw-out type vacuum circuit breaker is an electronic device that switches a relatively high voltage circuit and interrupts a power supply circuit over a fault current such as a short-circuit current to protect a line (i.e., a cable) and a load device.

With reference to FIG. 1, a main circuit unit of the vacuum circuit breaker includes a bushing terminal 1, a tulip assembly 3, a terminal 4, and an insulating bushing 5. The bushing terminal 1 is inserted into the tulip assembly component mounted at a front end of the main circuit unit of the circuit breaker main body to constitute a conductive line, and there are two types of bushing terminals as shown in FIGS. 2 and 3.

The bushing terminals as shown in FIGS. 2 and 3 include actuator contact portions 1-a and 2-a connected with the tulip assembly 3, booth bar connection portions 1-b and 2-b connected with an external power source and a load side, and flange portions 1-c and 2-c fixed to a cradle or a wall face of a reception casing of the main body. Although the bushing terminal illustrated in FIG. 3 has a different shape as that of the bushing terminal illustrated in FIG. 2, but it has the same function as that of the bushing terminal illustrated in FIG. 2.

The tulip assembly 3 is flexibly fixed to a central shaft of the terminal 4 and movable in a lengthwise direction. When the tulip assembly 3 is insertedly positioned in the bushing terminal 1, it is electrically connected.

The bushing terminals of FIGS. 2 and 3 are the same functionally, and a large air circuit breaker employs the bushing terminal of FIG. 2 while a middle and small air circuit breaker employs the bushing terminal of FIG. 3.

The fabrication methods of the bushing terminals of FIGS. 2 and 3 are different. The bushing terminal of FIG. 2 is fabricated according to a method in which the bushing terminal is divided into two parts and welded, and the flange 1-c is divided in a semi-circular state, inserted into the terminal body and then fixed with a screw or a rivet. Meanwhile, the bushing terminal of FIG. 3 is integrally fabricated by using a casting method, which is then cut so as to be completed.

In this case, the fabrication method of the bushing terminal of FIG. 2 involves various wasteful factors. That is, it takes excessively long working hours, the fabrication unit cost is high because of the necessity of subsidiary materials such as silver, lead, etc, the production costs increases due to a poor productivity, and silver-plating must be performed even on the unnecessary flange portion.

Meanwhile, the fabrication method of the bushing terminal of FIG. 3 has the following problems. That is, because the bushing terminal is fabricated according to a casting method, the period of delivery required for fabrication is lengthened. Also, because its tissue is not densely formed, the conductivity easily deteriorates, and air bubbles included in the bushing terminal may lead to a quality problem. In addition, much time is required for machining after the casting operation, and the flange surface is unnecessarily silver-plated.

SUMMARY OF THE INVENTION

Therefore, in order to address the above matters, the various features described herein have been conceived.

An aspect of the present invention provides a bushing terminal of a vacuum circuit breaker and its fabricate method capable of removing wasteful factors in an integration type bushing terminal fabrication method and improving productivity.

According to an aspect of the present invention, there is provided a bushing terminal of a vacuum circuit breaker, including: a terminal body having a cylinder that can be inserted into the interior of a contactor and annular protrusions formed to be protrude from an outer circumferential surface of the cylinder; and a flange having an insertion hole through which the cylinder is inserted, wherein the annular protrusions are plastic-deformed so as to be fixed to the insertion hole of the flange.

The annular protrusion may include a stop protrusion formed to be in contact with an edge portion of the insertion hole of the flange.

At least a portion of an inner wall of the insertion hole may have a tapered face.

One or more rotation hindering recesses may be formed on the inner wall of the insertion hole.

The plurality of rotation hindering recesses may be formed at regular intervals.

According to another aspect of the present invention, there is provided a bushing terminal of a vacuum circuit breaker, including: a terminal body having a coupling portion formed at one end portion thereof and a cylinder inserted into the interior of a contactor; and a flange having an insertion hole to which the coupling portion is inserted, wherein the coupling portion of the terminal body is plastic-deformed so as to be fixed to the insertion hole.

An annular coupling protrusion is formed on an upper outer circumferential portion of the coupling portion.

At least a portion of the inner wall of the insertion hole may have a tapered face.

A rotation hindering recess may be formed at the insertion hole of the flange to prevent a rotation with respect to the coupling portion.

According to another aspect of the present invention, there is provided a method for fabricating a bushing terminal of a vacuum circuit breaker, including: fabricating a terminal body including a cylinder with a plastic-deformation region on an outer circumference thereof; fabricating a flange having an insertion hole through which the plastic-deformation region of the cylinder is to be inserted; inserting the plastic-deformation region of the cylinder into the insertion hole; and pressing the plastic-deformation region to plastically deform the plastic-deformation region.

The plastic-deformation region may include an annular protrusion formed to be protruded from the outer circumference of the cylinder.

The plastic-deformation region may extend from one end portion of the cylinder and may have a coupling portion with an outer diameter smaller than that of the cylinder.

The insertion hole may have a tapered face.

The plastic-deformation portion may be pressed by a press so as to be deformed.

The bushing terminal of the vacuum circuit breaker and its fabrication method according to exemplary embodiments of the present invention have the following advantages.

That is, because the flange of the bushing terminal is fabricated as a separate component and then plastic-deformed by a press or the like so as to be coupled to the terminal body, the productivity can be improved to lead to a reduction in a fabrication cost, compared with the related art fabrication method.

The foregoing and other objects, features, aspects and advantages of the present invention will become more apparent from the following detailed description of the present invention when taken in conjunction with the accompanying drawings.

DETAILED DESCRIPTION OF THE INVENTION

A bushing terminal of a vacuum circuit breaker and a fabrication method thereof according to exemplary embodiments of the present invention will now be described with reference to the accompanying drawings.

Figure 1:
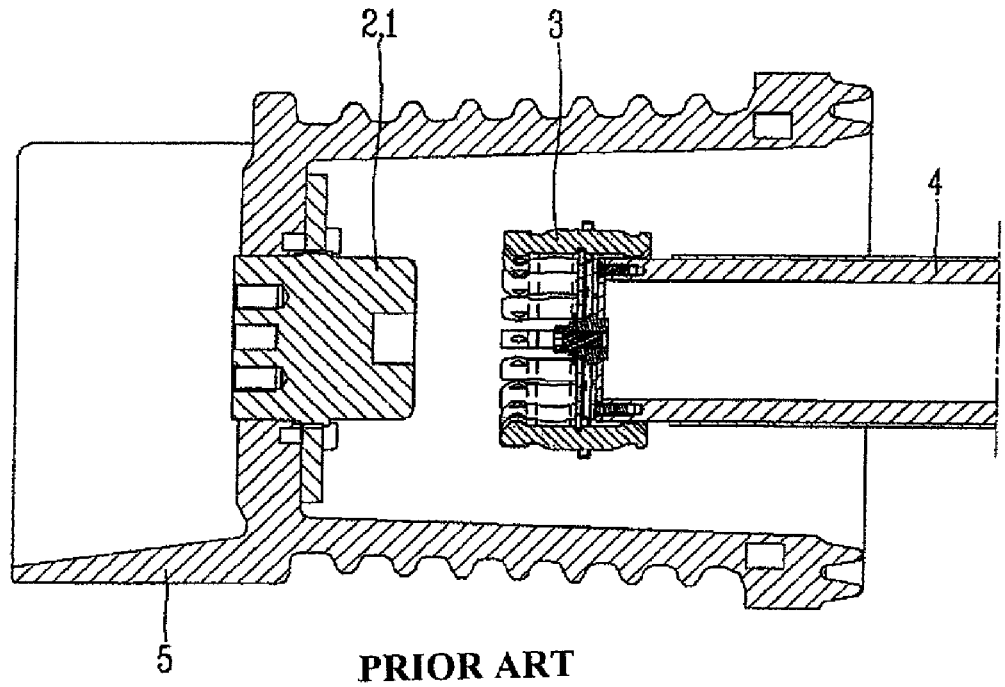
FIG. 1 is a sectional view of a tulip type contactor and a bushing terminal of a vacuum circuit breaker.
Figure 2:
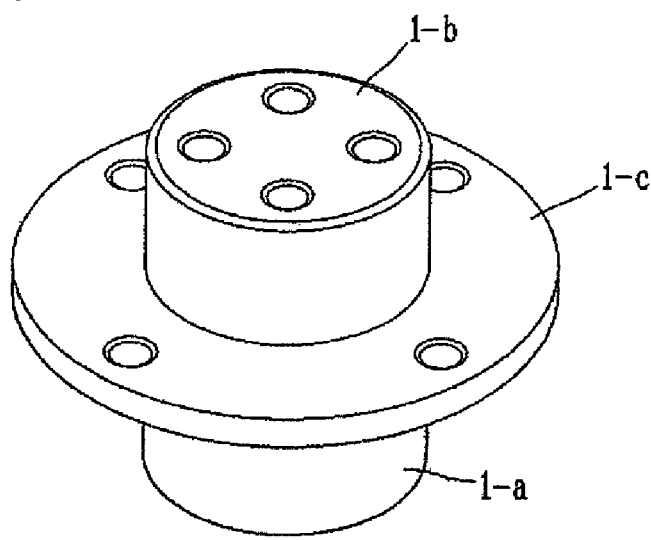
FIG. 2 is a perspective view of a type of a bushing terminal of FIG. 1.
Figure 3:
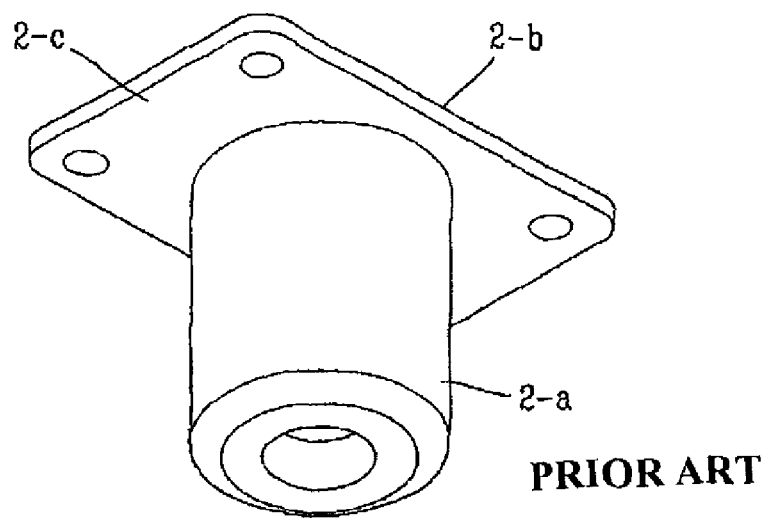
FIG. 3 is a perspective view of another type of the bushing terminal of FIG. 1.
Figure 4:
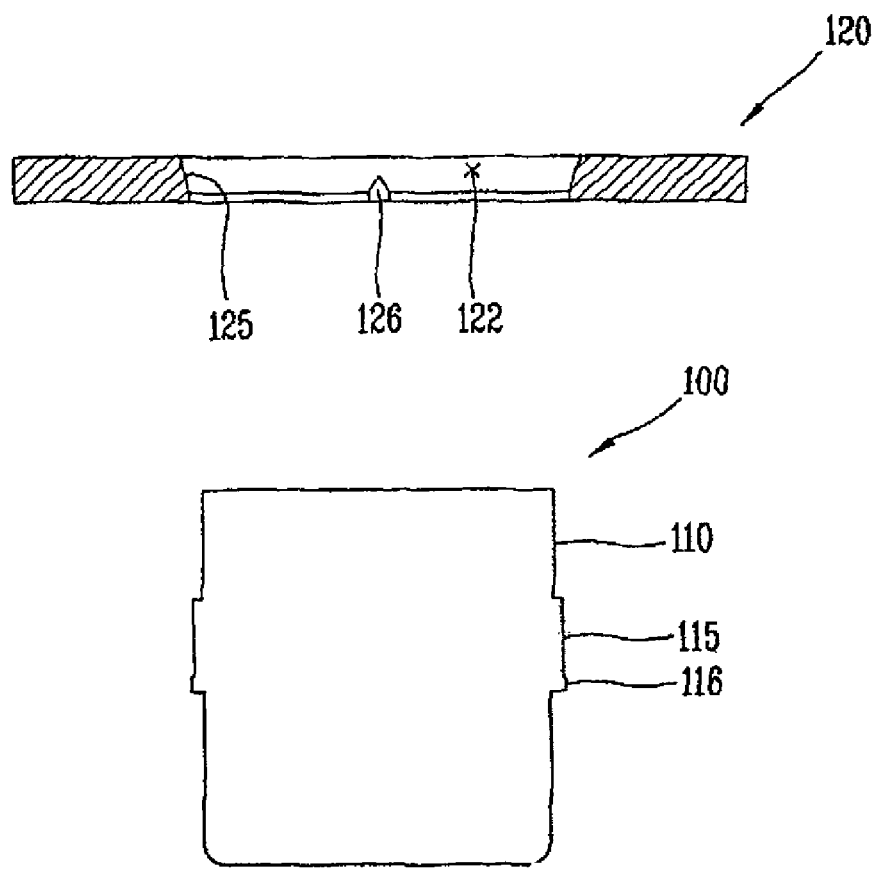
FIG. 4 shows a state before a bushing terminal of a vacuum circuit breaker is assembled according to one exemplary embodiment of the present invention.
Figure 5:
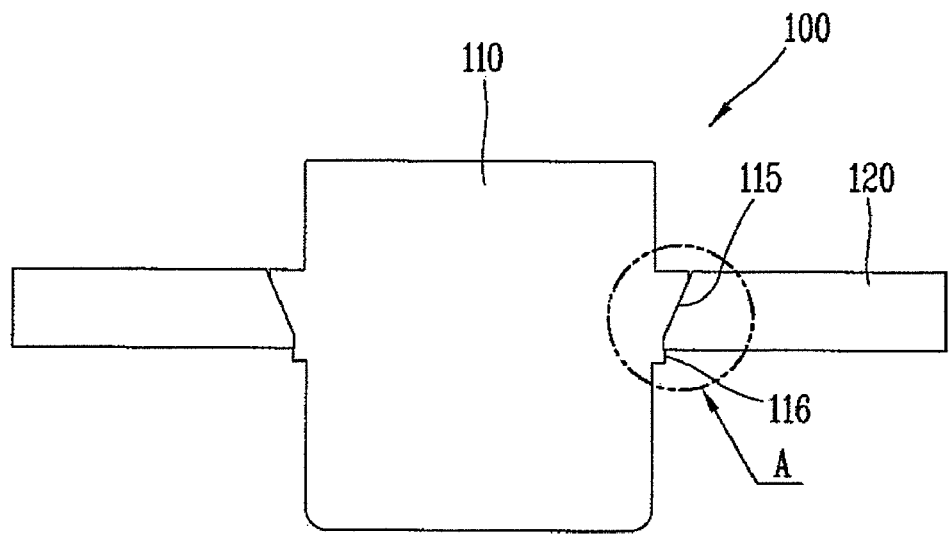
FIG. 5 shows a state after the bushing terminal of FIG. 4 is assembled.
Figure 6:
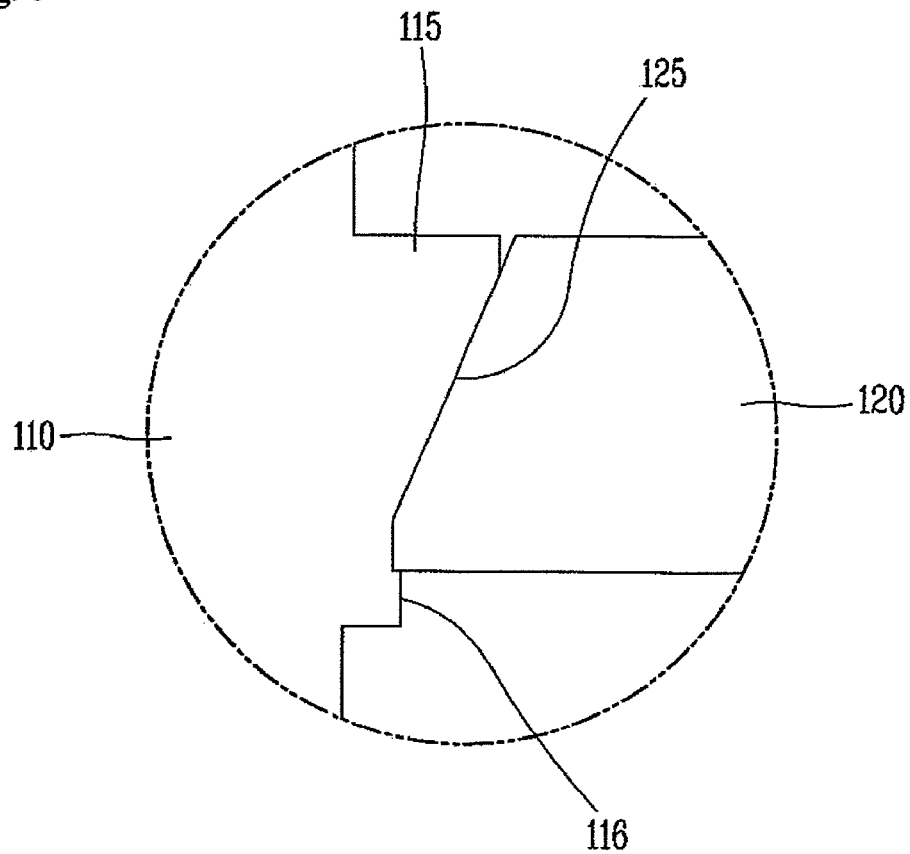
FIG. 6 is an enlarged view of a portion 'A' in FIG. 5.
Figure 7:
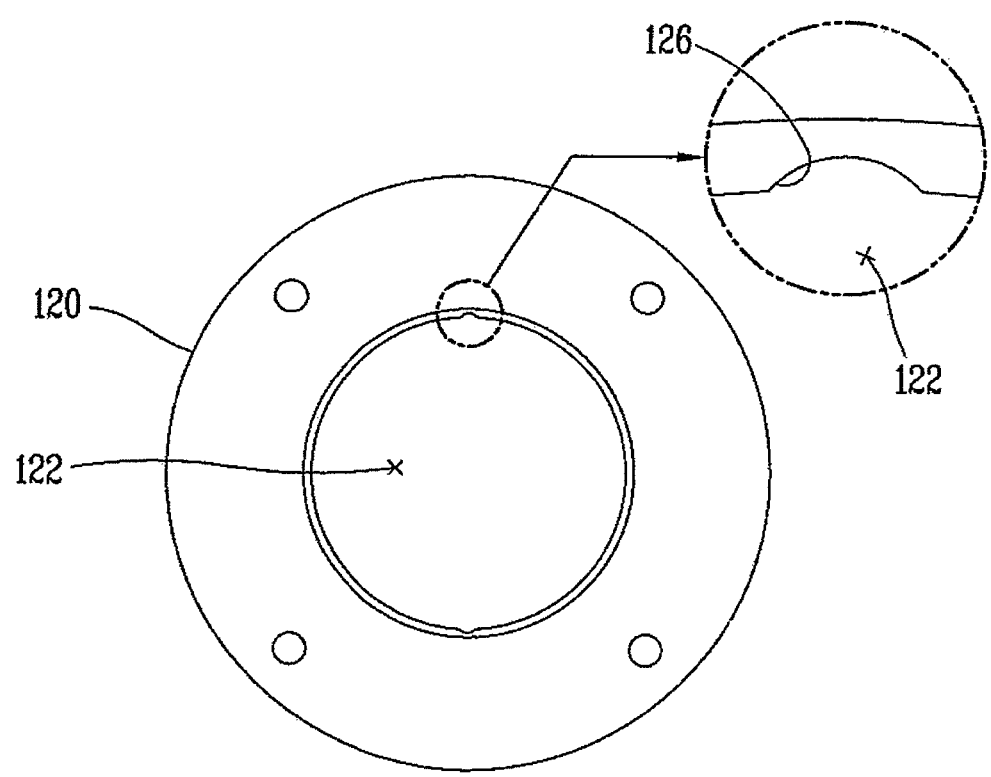
FIG. 7 is a plan view of a flange of FIG. 4.

FIG. 4 shows a state before a bushing terminal of a vacuum circuit breaker is assembled according to one exemplary embodiment of the present invention, FIG. 5 shows a state after the bushing terminal of FIG. 4 is assembled, FIG. 6 is an enlarged view of a portion 'A' in FIG. 5, and FIG. 7 is a plan view of a flange of FIG. 4.

As shown in FIGS. 4 and 5, the bushing terminal of a vacuum circuit breaker according to an exemplary embodiment of the present invention includes a terminal body 100 including a cylinder 110 that can be inserted into the interior of a tulip type contactor and an annular protrusion 115 protruded to cover an outer circumferential surface of the cylinder 110, and a flange 120 with an insertion hole 122 through which the cylinder 110 is inserted.

The flange 120 is assembled by being press-fit to the terminal body 100. Namely, after the insertion hole 122 of the flange 120 is inserted into the annular protrusion 115 of the terminal body 100, it is forged by using a press or any other tools to fix the flange 120 to the annular protrusion 115 of the terminal body 100.

With reference to FIG. 6, the annular protrusion 115 of the terminal body 100 includes a stop protrusion 116 caught by the insertion hole 122 of the flange 120. The stop protrusion 116 supports the flange 120 from the lower side of the annular protrusion 115 when the flange 120 is inserted from the lower portion to the upper portion of the terminal body 100, and the flange 120 may be fixed to the annular protrusion 115 of the terminal body 100 in a state that the annular protrusion 115 is inserted into the insertion hole 122.

Here, an inner diameter of the insertion hole 122 in the direction in which the cylinder 110 of the terminal body 100 is inserted is gradually increased along a proceeding direction of the annular protrusion 115, including a tapered extension portion 125. When the flange inserted into the cylinder 110 is merged, an upper portion of the annular protrusion 115 is tapered in the form corresponding to the extension portion 125. In this case, the flange 120 may pass through the stop protrusion 116 of the annular protrusion 115 by virtue of the extension portion 125 of the insertion hole 122, so as to be supported by the stop protrusion 116.

With reference to FIG. 7, the flange 120 includes rotation prevention recesses 126 formed to be concave at the insertion hole 122 side. Namely, when the annular protrusion 115 is forged, the outer circumference of the annular protrusion 115 is protruded to the interior of the rotation prevention recesses 126 so as to be engaged, so the flange 120 can be prevented from rotating within the annular protrusion 115 formed in a circular shape. The rotation prevention recesses 126 are formed at the interval of 180 degrees and face each other, thereby reliably preventing the rotation of the flange 120 on the annular protrusion 115.

A method for fabricating the bushing terminal of a vacuum circuit breaker according to an exemplary embodiment of the present invention includes: fabricating the cylinder 110 constituting the terminal body 100 such that the annular protrusion 115 is formed on the outer circumference of the cylinder 110 as a plastic-deformation region; forming the insertion hole 122, into which the annular protrusion of the cylinder 110 is inserted, at the flange 120; and inserting the flange 120 into the annular protrusion 115 of the terminal body 120 and performing plastic-deformation thereon by using a press and the like.

The annular protrusion 115 include the stop protrusion 116 caught by the insertion hole 122 of the flange 120, an the insertion hole 122 of the flange includes an extension portion 125 having an inner diameter which becomes gradually large. The rotation prevention recesses 126 may be formed on the insertion hole 122 of the flange 120.

To sum up, the method for fabricating the bushing terminal of a vacuum circuit breaker according to an exemplary embodiment of the present invention is a method in which the bushing terminal is divided into two parts and then compressed by using the plastic deformation of the material. In this case, the portions plastically deformed by the compression are tapered so as not to be released, and the internal space of the tapered portion is filled with facing components.

Figure 8:
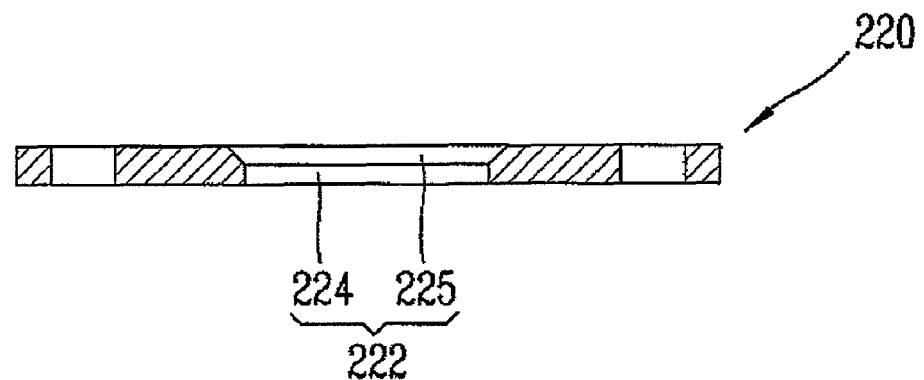
FIG. 8 shows a state before a bushing terminal of a vacuum circuit breaker is assembled according to another exemplary embodiment of the present invention.
Figure 8:
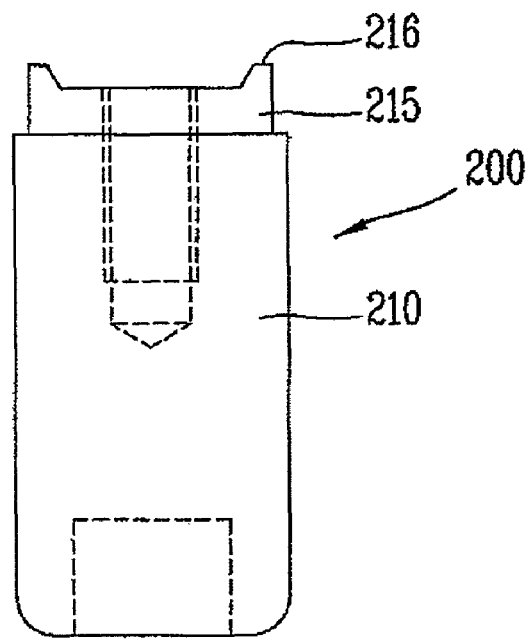
Figure 9:
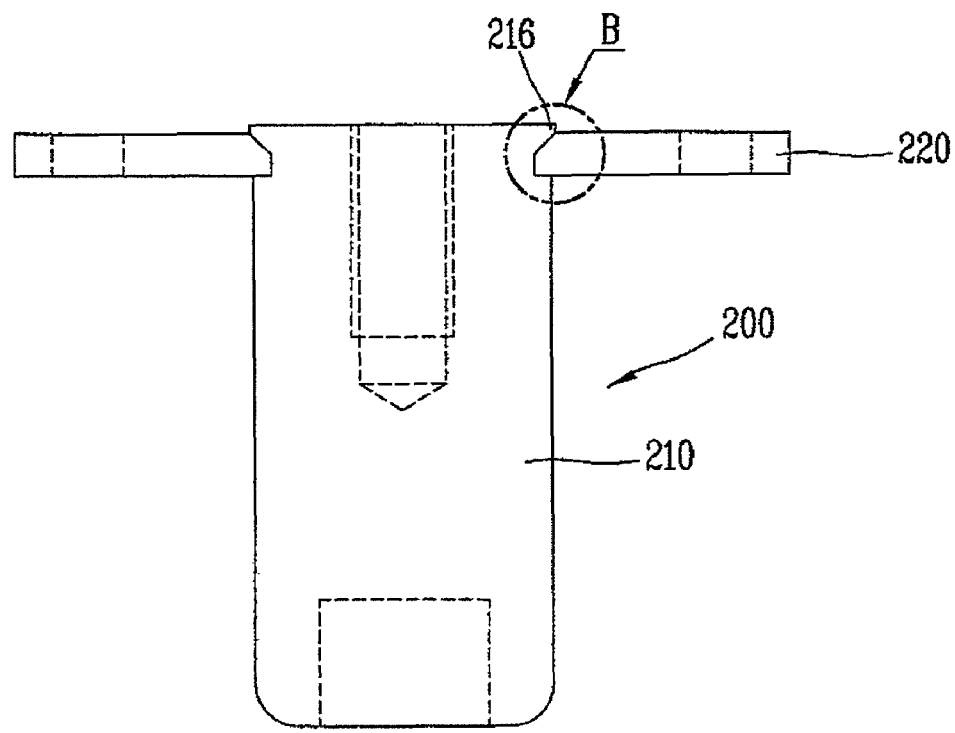
FIG. 9 is shows a state after the bushing terminal of FIG. 8 is assembled.
Figure 10:
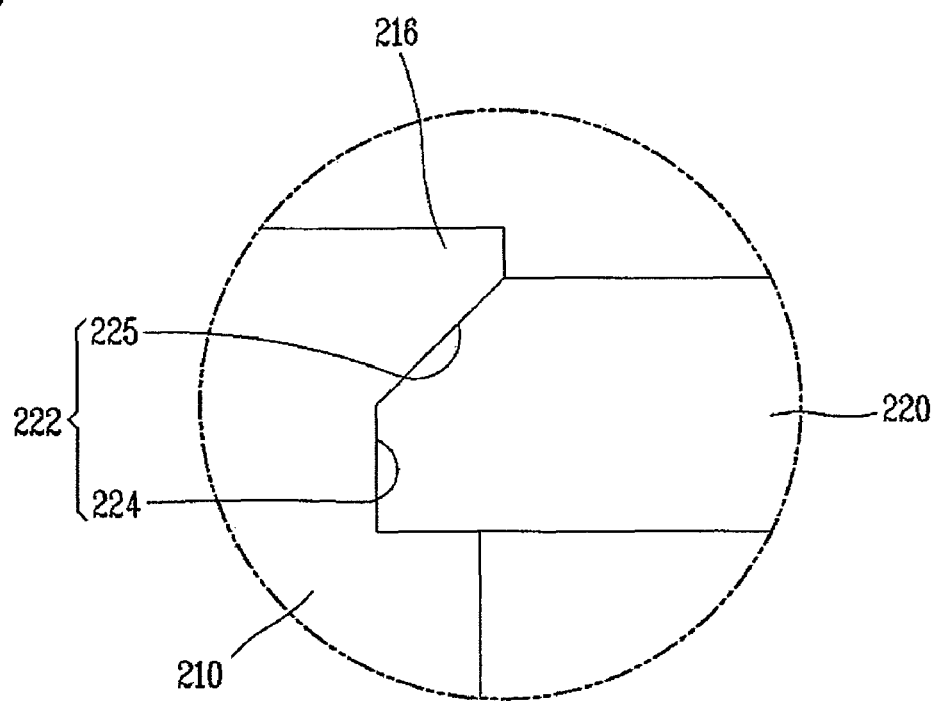
FIG. 10 is an enlarged view of a portion 'B' in FIG. 9.
Figure 11:
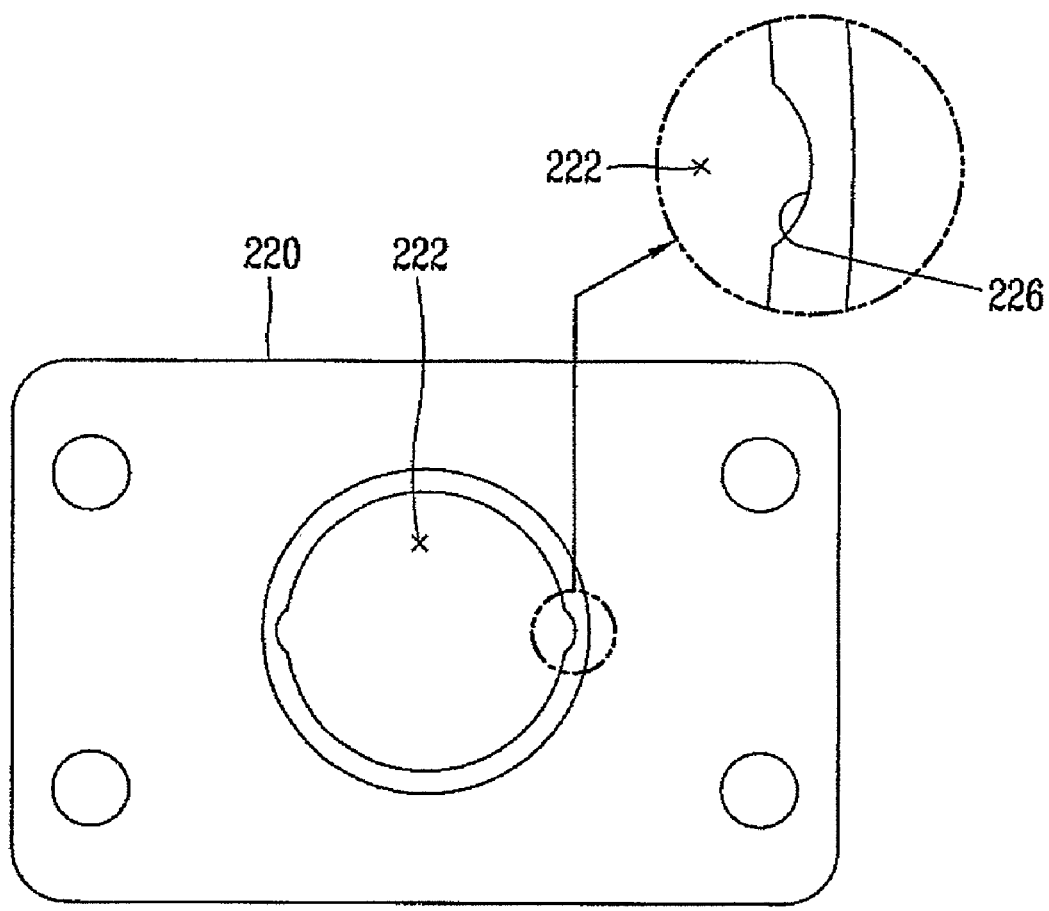
FIG. 11 is a plan view of a flange of FIG. 8.

FIG. 8 shows a state before a bushing terminal of a vacuum circuit breaker is assembled according to another exemplary embodiment of the present invention, FIG. 9 is shows a state after the bushing terminal of FIG. 8 is assembled, FIG. 10 is an enlarged view of a portion 'B' in FIG. 9, and FIG. 11 is a plan view of a flange of FIG. 8.

As shown in FIGS. 8 and 9, a bushing terminal of a vacuum circuit breaker according to another exemplary embodiment of the present invention includes a terminal body 200 having a cylinder 210 that can be inserted into a tulip type contactor. A coupling portion 215 having an outer diameter smaller than that of the cylinder 210 is formed at an end portion of the cylinder 210. Also, the bushing terminal includes a flange 220 having an insertion hole 222 to which the coupling portion 215 is inserted. The flange 220 includes a section where the inner diameter of the insertion hole 222 is larger than an outer diameter of the coupling portion 215.

With reference to FIGS. 9 and 10, in the state that the flange 220 is inserted into the coupling portion 215 so as to be supported by an upper portion of the cylinder 210, the coupling portion 215 is plastic-deformed to allow the flange 220 to be fixed to an upper portion of the cylinder 210. Here, an annular coupling protrusion 216 is formed on the upper outer circumference of the coupling portion 215. Because the coupling protrusion 216 is formed on the circumference of the upper portion of the coupling portion 215, it can be easily plastic-deformed through compression and blocks the upper portion of the insertion hole 222 of the flange 220.

The insertion hole 222 of the flange 220 includes a coupling hole 224 having substantially the same inner diameter as an outer diameter of the coupling portion 215 and an extending hole 225 gradually extending from the coupling hole 224. Namely, the coupling protrusion 216 is plastic-deformed to have a tapered shape to fit the extending hole 225, and the flange 220 may be constrained to the coupling portion 215. With reference to FIG. 11, likewise as in the above-described exemplary embodiment, rotation hindering recesses 226 are formed on the insertion hole 222 of the flange 220. When the flange 220 is welded to the coupling portion 215, the outer circumference of the coupling portion 216 fills the inner side of the rotation hindering recesses 226, whereby the flange 220 can be prevented from being rotated on the coupling portion 215.

Here, the plated layer on the upper surface of the coupling portion 215 surrounded by the coupling protrusion 216 is maintained even after the plasticity process is performed. Thus, although the plating was performed in advance, the original plated layer can be obtained.

As so far described, because the productivity of the bushing terminal of the vacuum circuit breaker is improved and the material cost is reduced, the fabrication cost can be reduced by about 40%, and the quality of the bushing terminal can be improved through a fabrication method allowing for obtaining a 100% conductivity, not 89% conductivity of a casting method.

As the present invention may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A bushing terminal of a vacuum circuit breaker, the bushing terminal comprising:
a terminal body having a cylinder that can be inserted into the interior of a contactor and an annular protrusion formed to protrude from an outer circumferential surface of the cylinder; and
a flange having an insertion hole through which the cylinder is inserted, wherein the annular protrusion is plastically-deformed so as to overlap an upper face of an edge portion of the insertion hole of the flange,
the annular protrusion being provided with a stop protrusion that supports a lower surface of an edge portion of the insertion hole of the flange so that the edge portion of the insertion hole is engaged between the plastically-deformed portion of the annular protrusion and the stop protrusion.

2. The bushing terminal of claim 1, wherein at least a portion of an inner wall of the insertion hole has a tapered face.

3. The bushing terminal of claim 1, wherein one or more rotation hindering recesses are formed on the inner wall of the insertion hole.

4. The bushing terminal of claim 3, wherein the plurality of rotation hindering recesses are formed at regular intervals.

\* \* \* \* \*